Patented Aug. 18, 1931

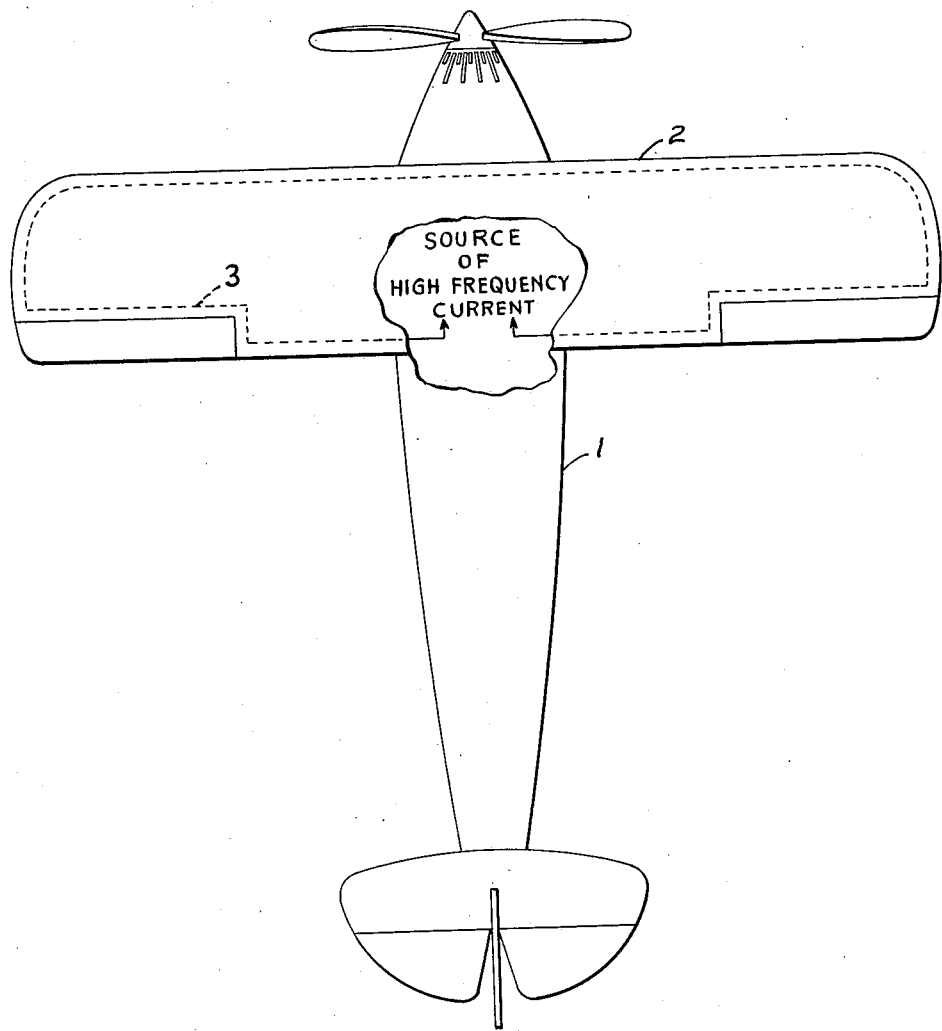

1,819,497

UNITED STATES PATENT OFFICE

CHARLES F. CHISHOLM, OF STATEN ISLAND, NEW YORK

COMBATING SLEET ON AIRPLANES

Application filed May 16, 1930. Serial No. 452,833.

This invention relates to combating sleet on airplanes, the expression "combating" being used to designate either the prevention of sleet formations or the removal of sleet after it has formed.

The major portion of the lifting effect of an airplane wing is due to the sub-atmospheric pressure produced adjacent the upper surface of the wing as the wing moves through the air. When sleet forms on the wing, the contour of the wing and the nature of the surface are so changed as to reduce the tendency of the wing to form a vacuum adjacent its upper surface. The result is that when sleet starts to form on the wings of an airplane, the lifting effect of the wings may fall off so rapidly as to force the plane down in a very few minutes, even though the accumulated sleet has increased the weight of the plane but little.

The general object of the present invention is to provide a method and/or apparatus for effectively combating sleet on an airplane, and particularly on the wings of the plane.

Another object of the invention is to provide a method and/or apparatus for combating sleet which is effective to quickly remove any sleet which has started to accumulate.

Another object is to provide sleet combating apparatus which adds but little to the weight of the plane.

Other objects of the invention will be obvious from the following disclosure.

The invention as herein disclosed is particularly applicable to airplanes having metal wing surfaces, but is also applicable to airplanes having metal framework in the wings irrespective of the material of the wing surfaces. In the particular form of the invention disclosed, a conducting loop is placed within the wing of the plane and is so arranged that when the loop is suitably excited, the wing surfaces on which sleet is to be combated will be traversed by an alternating magnetic field. This loop may consist of one or more turns of insulated wire, and may be arranged in one or more sections so that parts of the plane which it is not desired to subject to a magnetic field may be excluded from the magnetic action of the loop.

The figure of the drawing is a diagrammatic plan view of a monoplane showing the invention diagrammatically.

The airplane is shown as comprising a fuselage 1 and a single wing 2 which may be considered as mounted above the fuselage. The wing may be considered as of the all metal type with metal framework and metal wing surfaces. Within the wing there is a conducting loop 3 adapted to be excited by any suitable source of high frequency current such as an engine driven alternator, a wind driven alternator, an oscillator, etc. Where the plane is radio equipped, a single oscillator may be used for the radio sending set and for exciting the loop. In such case, the oscillator should be of sufficient power; and it should be capable of a wide tuning range as usually lower frequencies will be desired for sleet combating than for radio sending. When the loop is excited, the metal wing surfaces are acted upon by an alternating magnetic field and thus alternating currents are induced in the wing surfaces, which currents heat the wing and combat the sleet by either preventing its formation or melting sleet which has already formed. If only the framework of the wing is metal (the wing surfaces being nonconducting) the framework will be heated and the air trapped within the wing will convey the heat to the wing surfaces.

The amount of energy which it is necessary to dissipate in the wing surface in order to combat the sleet is comparatively small, because a very slight increase in the temperature of the wing surface will suffice. If the atmospheric temperature is slightly below freezing, any precipitation is either in the form of hail or snow, and hence sleet does not form on the wing. If the atmospheric temperature is slightly above freezing, any precipitation is in the form of rain, and again sleet does not form on the wing. Accordingly, when sleet starts to form, only a relatively small increase of temperature of the wing surface is necessary to take the wing out of the sleet forming temperature range. As soon as the wing has warmed enough to loosen the sleet from the wing, the accumulated sleet will blow off.

The energy which is useful in combating the sleet is that which is actually dissipated in the wing surfaces and with an exciting current of relatively high frequency, efficient transfer of energy to the wing surfaces can be accomplished without utilizing magnetic core interlinkage between the loop and the wing surfaces. This is a very practical point because of the desirability of keeping the weight of the airplane at a minimum. Furthermore, with a high frequency exciting current, the wing surfaces in which the current is induced become, electrically speaking, a high resistance load and only a relatively small value of exciting current in the loop is required to transmit the necessary energy to the wing surfaces. This reduces the weight of the loop and the weight of the equipment necessary to excite the loop.

The invention may be embodied in forms other than those particularly disclosed, and the method may be carried out by various forms of apparatus, and hence the present disclosure is to be considered as illustrative only, and not as limiting the scope of the invention.

What is claimed is:—

1. The method of combating sleet on the wings of an airplane which comprises inducing alternating currents in metal portions of the wings, whereby heat is generated in said metal portions as opposed to being conducted to such portions.

2. The method of combating sleet on airplane wings having metal surfaces which comprises inducing alternating currents in said surfaces, whereby heat is generated in the metal surfaces as opposed to being conducted to such surfaces.

3. The method of combating sleet on the wings of an airplane which comprises subjecting metal portions of the wings to the action of a high frequency electromagnetic field, whereby heat is generated in said metal portions as opposed to being conducted to such portions, the frequency being sufficiently high to render interlinkage with a magnetic core unnecessary.

4. The method of combating sleet on airplane wings having metal surfaces which comprises subjecting said surfaces to the action of a high frequency electromagnetic field, whereby heat is generated in said metal surfaces as opposed to being conducted to such surfaces, the frequency being sufficiently high to render interlinkage with a magnetic core unnecessary.

5. In combination, a metal surfaced airplane wing, a conducting loop magnetically embracing said wing, and means to excite said loop with alternating current to combat sleet on the wing, by thereby generating heat in said metal surface as opposed to conducting heat to such surface.

6. In combination, a metal surfaced airplane wing, a conducting non-heating loop within said wing and arranged to subject said surfaces to the action of an alternating electromagnetic field, and means to excite said loop with an alternating current to combat sleet on the wing by thereby generating heat in said metal surface as opposed to conducting heat to such surface.

7. In combination, an airplane wing having metal portions, a conducting non-heating loop magnetically embracing metal portions of said wing, and means to excite said loop with an alternating current to combat sleet on the wing by thereby generating heat in said metal portions as opposed to conducting heat to such portions.

8. In combination, a metal surfaced airplane wing, a conducting non-heating loop within said wing and arranged to subject said surfaces to the action of an alternating electromagnetic field, and means to excite said loop with a high frequency current to thereby generate heat in said metal surface as opposed to conducting heat to such surface, the frequency being sufficiently high to combat sleet on the wing without magnetic core interlinkage between the loop and the wing surfaces.

9. In combination, an airplane wing having metal portions, a conducting non-heating loop magnetically embracing metal portions of said wing, and means to excite said loop with a high frequency current to thereby generate heat in said metal portions as opposed to conducting heat to such portions, the frequency being sufficiently high to combat sleet on the wing without magnetic core interlinkage between the loop and said embraced portions.

10. In combination a metal surfaced airplane wing, a horizontally disposed conducting loop within said wing and arranged to subject at least a portion of the top surface of the wing to the action of a magnetic field, and means to excite said loop with an alternating current to thereby generate heat in said top surface as opposed to conduction to such surface.

11. An airplane heating system for combating sleet comprising a metal wing surface which is per se a heating element, and means comprising a non-heating electrical loop operative to energize said heating element.

12. An airplane heating system for combating sleet comprising a metal structural element of the airplane, which element is per se a heating element, and means comprising a non-heating electrical loop operative to energize said heating element.

CHARLES F. CHISHOLM.